United States Patent [19]
Fisk

[11] Patent Number: 5,855,013
[45] Date of Patent: Dec. 29, 1998

[54] METHOD AND APPARATUS FOR CREATING AND MAINTAINING A COMPUTER DATABASE UTILIZING A MULTI-PURPOSE DATA FORMAT

[75] Inventor: Dave C. Fisk, Redondo Beach, Calif.

[73] Assignee: Sun Microsystems, Inc., Palo Alto, Calif.

[21] Appl. No.: 671,312

[22] Filed: Jul. 1, 1996

[51] Int. Cl.[6] .................................................. G06F 7/49
[52] U.S. Cl. .................................. 707/3; 707/2; 707/100; 707/103
[58] Field of Search .................................. 395/611, 614, 395/603, 602; 707/2, 3, 100, 103

[56] References Cited

U.S. PATENT DOCUMENTS

| | | | |
|---|---|---|---|
| 4,468,728 | 8/1984 | Wang ........................................ | 364/200 |
| 4,961,139 | 10/1990 | Hong et al. ............................. | 364/200 |
| 5,276,830 | 1/1994 | Endo et al. ............................. | 395/425 |
| 5,276,874 | 1/1994 | Thomson ................................. | 395/600 |
| 5,418,961 | 5/1995 | Segal et al. ............................ | 395/700 |
| 5,446,854 | 8/1995 | Khalidi et al. ......................... | 395/401 |
| 5,515,531 | 5/1996 | Fujiwara et al. ....................... | 395/600 |
| 5,537,589 | 7/1996 | Dalal ....................................... | 395/600 |
| 5,551,027 | 8/1996 | Choy et al. ............................. | 395/600 |

*Primary Examiner*—Wayne Amsbury
*Assistant Examiner*—Jean R. Homere
*Attorney, Agent, or Firm*—Graham & James LLP

[57] ABSTRACT

A method and apparatus for creating and maintaining a computer database using a virtual index system. The database of the present invention is organized as a hierarchical, tree-like structure. At the most basic level, the hierarchy consists of data objects. The intermediate levels of the hierarchy group the data objects into object classes. Each object class is allocated a class descriptor table having one entry for each class member. Each entry is a poly radix bit string which describes the corresponding data object and may be hashed to return a pointer to the data object. The top level of the hierarchy is a global object table containing one entry for each object class. Each entry is a poly radix bit string which contains data which describes a particular object class and may be hashed to return a pointer to the instance table associated with the object class.

17 Claims, 7 Drawing Sheets

METHOD AND APPARATUS FOR CREATING AND MAINTAINING A COMPUTER DATABASE UTILIZING A MULTI-PURPOSE DATA FORMAT

FIELD OF THE INVENTION

The present invention relates to database systems for use in a data processing system and, more specifically, to database systems which allow stored data to be quickly located and retrieved.

BACKGROUND OF THE INVENTION

Computer database management systems are software programs which allow data objects to be stored in database memory in a specialized, searchable, fashion. Once stored, queries may be formulated, and the database may be searched for the data object, or data objects, which match a particular query.

Generally, the data objects which are stored in a computer database consist of a number of data fields, each of which describes an attribute of the data object being stored. For example, in a database of employee records, each data object might include a data field corresponding to an individual employee's name, while a second data field might correspond to the employee's age. Searches may be performed by scanning the computer memory for all data fields which correspond to a particular criteria. For example, in the case of the employment database just described, it would be possible to search for all records having a particular name, or a particular birth date. To search for an employee having a particular name and birth date, however, two searches must be performed in sequence. This, of course, requires additional time and computer resources.

In some cases, an index may be constructed within the computer memory to expedite searches of a database. For example, in the case of the employment database an index of employee names might be constructed. The index could then be searched to find a particular name and the employee record associated with that name. A similar index of all employee birth dates could be constructed and searched to find all employees with a particular birth date. Searching for an employee having a particular name and birth date would still, however, require that both indices be consulted.

SUMMARY OF THE INVENTION

The present invention provides a method and apparatus for creating and maintaining a computer database using a virtual index system. The database of the present invention is described in terms of a hierarchical, tree-like structure. At the most basic level, the hierarchy includes a series of data objects which may consist of nearly any data type representable in computer memory. For example, data objects may take the form of strings, floating point numbers, integer numbers or aggregate data types.

The intermediate levels of the hierarchy include a series of classes. Each class corresponds to a logical grouping of data objects. Structurally, each class is maintained as an indexed array known as an "instance table." Each entry in the instance table is a poly radix bit string. For the purposes of the present invention, a poly radix bit string is a bit string which contains zero or more substrings. Each substring may contain its own individual data. Each poly radix bit string contains information which defines a particular class member. Additionally, each poly radix bit string may be hashed to yield a pointer to the data object associated with a particular class member.

A global object table forms the top level of the hierarchy. The global object table is an indexed array of poly radix bit strings, each of which contains information which defines a particular object class. When hashed, the poly radix bit string returns a pointer to the instance table associated with the object class described by the poly radix bit string.

In some cases, it may be desirable to use the database of the present invention in combination with complex data objects, or data objects which are described in terms of several global objects. In such cases, a complex entry is created in the global object table. The complex entry is a poly radix bit string which is itself composed of several smaller substrings. Each substring within the complex entry describes a global object in the database. Additionally, each substring within the complex entry may be used to access the entry in the global object table associated with the global object described by the substring. The entire poly radix bit string, consisting of the smaller substrings, is hashable to return a pointer to an instance table associated with the complex entry.

In accordance with the purpose of the present invention, as broadly described hereby, the invention is a method for storing data objects in the memory of a data processing system. The method of the present invention, which is performed by the data processing system, comprises the steps of: grouping the data objects to form object classes; creating an instance descriptor table for each object class, each instance descriptor table having one entry for each data object in the associated object class, each entry being a poly radix bit string containing data which describes the corresponding data object, each poly radix bit string also being hashable to return a pointer to the corresponding data object; and creating a global object table having one entry for each object class, each entry being a poly radix bit string containing data which describes the corresponding object class, each poly radix bit string also being hashable to return a pointer to the instance descriptor table associated with the object class.

In further accordance with the purpose of the present invention, as broadly described hereby, the invention is a data structure for manipulating data objects in the memory of a data processing system. The data structure of the present invention comprises the following elements: an instance descriptor table for each class of data objects, each instance descriptor table having one entry for each data object in the associated object class, each entry being a poly radix bit string containing data which describes the corresponding data object, each poly radix bit string also being hashable to return a pointer to the corresponding data object; and a global object table having one entry for each object class, each entry being a poly radix bit string containing data which describes the corresponding object class, each poly radix bit string also being hashable to return a pointer to the instance descriptor table associated with the object class.

In further accordance with the purpose of the present invention, as broadly described hereby, the invention is an apparatus for manipulating a database stored in the memory of a data processing system. The apparatus of the present invention comprises: a first computer executable procedure for manipulating a global object table having one entry for each object class of data objects, each entry being a poly radix bit string containing data which describes the corresponding object class, each poly radix bit string also being hashable to return a pointer to the instance descriptor table associated with the object class; and a second computer executable procedure for manipulating an instance descriptor table, the instance descriptor table having one entry for each data object in an associated object class, each entry being a poly radix bit string containing data which describes the corresponding data object, each poly radix bit string also being hashable to return a pointer to the corresponding data object.

In still further accordance with the purpose of the present invention, as broadly described hereby, the invention is an article of manufacture. The article of manufacture comprises: a computer readable device encoded with a first computer executable procedure for manipulating a global object table having one entry for each object class of data objects, each entry being a poly radix bit string containing data which describes the corresponding object class, each poly radix bit string also being hashable to return a pointer to the instance descriptor table associated with the object class; and a second computer executable procedure encoded on the computer readable device for manipulating an instance descriptor table, the instance descriptor table having one entry for each data object in an associated object class, each entry being a poly radix bit string containing data which describes the corresponding data object, each poly radix bit string also being hashable to return a pointer to the corresponding data object.

Advantages of the present invention will become more fully apparent when the following detailed descriptions of the invention are read in conjunction with the accompanying drawings.

BRIEF DESCRIPTION OF THE DRAWINGS

The invention will now be described with reference to the accompanying drawings, wherein.

DETAILED DESCRIPTION OF THE PREFERRED EMBODIMENTS

The following description is of the best presently contemplated mode of carrying out the present invention. This description is made for the purpose of illustrating the general principles of the invention and is not to be taken in a limiting sense.

Figure 1:
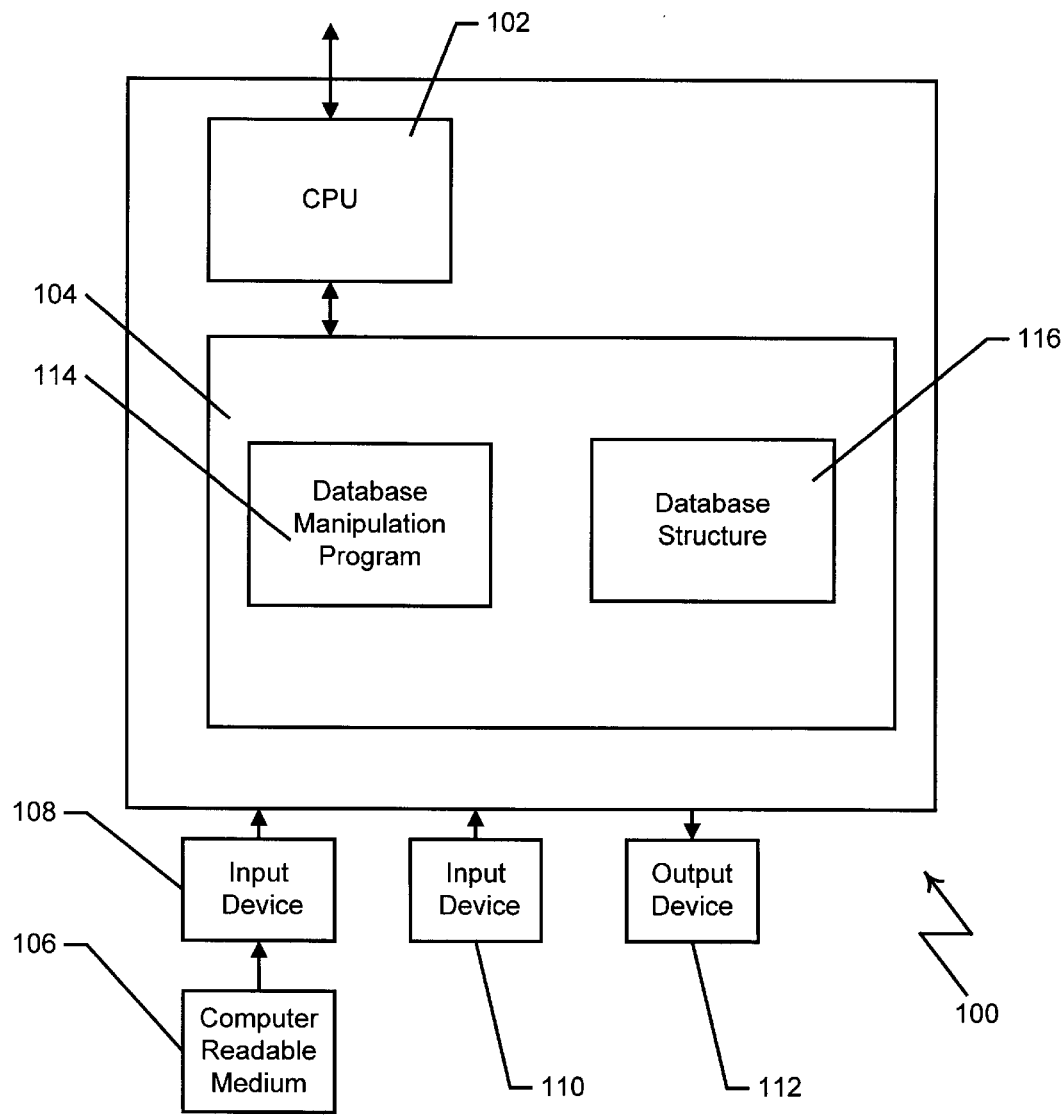
FIG. 1 is a block diagram of a data processing system in accordance with a preferred embodiment of the present invention.

FIG. 1 shows a data processing system 100, including a CPU 102 and a memory 104 connected to CPU 102. FIG. 1 also shows a computer readable medium 106 connected by an input device 108 to the data processing system 100. Additionally, an input device 110 and an output device 112 are connected to the data processing system 100. It will be understood by persons of ordinary skill in the art that data processing system 100 may also include various other input/output devices, peripherals, network connections, memories, CPUs, etc., which, for the sake of clarity, are not shown in the figure. Memory 104 includes a database manipulation program 114 and a database 116, both of which are discussed in more detail below.

Figure 2:
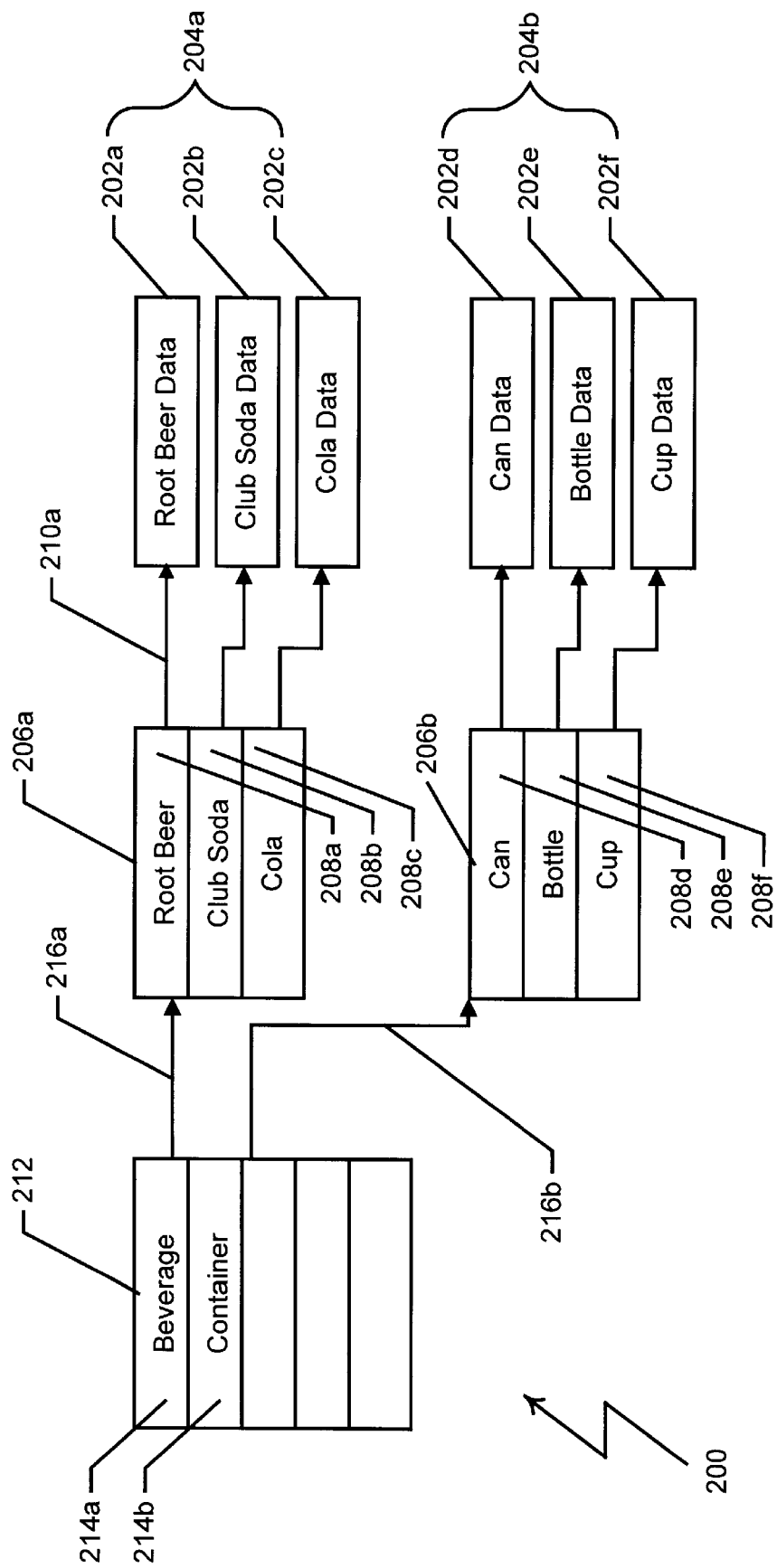
FIG. 2 shows a database in a computer memory of FIG. 1 after a plurality of data objects have been added.

Referring now to FIG. 2, the data structure which corresponds to database 116 of FIG. 1 is shown and generally designated 200. As may be appreciated by reference to FIG. 2, data structure 200 has a generally hierarchical, tree-like structure. At the most basic level, the data structure 200 includes data objects, of which data object 202a through 202f are representative. In general, data objects 202 may consists of any data object representable in computer memory including strings, floating point numbers, integer numbers or aggregate data types. For the purposes of illustration, the data objects 202 are shown to be positioned adjacently. It should be appreciated, however, that the data objects 202 can also be spaced in a random fashion within memory 104.

The intermediate levels of the data structure 200 function to group the data objects 202 into logical classes known as "object classes." In general terms, object classes are groupings of data objects which share common attributes or are logically associated in some other way. For example, data objects 202a through 202c all contain data relating to various types of beverages. These data objects are, therefore, grouped in a "beverage" object class 204a. Similarly, data objects 202d through 202f all contain data relating to various types of containers. Therefore, data objects 202e through 202f may all logically be grouped in a "container" object class 204b.

Structurally, the grouping of data objects 202 into object classes 204 is accomplished by providing an instance table 206 for each object class. In FIG. 2, for example, instance table 206a is associated with object class 204a and instance table 206b is associated with object class 204b. Each instance table 206 is implemented as an indexed array with an entry 208 for each data object 202 in the associated object class 204. In the case of object class 204a, this means that instance table 206a has three entries, 208a through 208c. Entry 208a corresponds to data object 202a. Entry 208b corresponds to data object 202b and entry 208c corresponds to data object 202c. As may be appreciated by reference to FIG. 2, there is a similar one-to-one mapping between instance table 206b and data objects 202d through 202f.

Each entry 208 in each instance table 206 is implemented as a poly radix bit string. Structurally, a poly radix bit string is a string of bits which contain data which describes a corresponding object. This is demonstrated by entry 208a which contains data which describes "root beer." Entry 208a is, of course, associated with data object 202a which contains data for root beer. For the purposes of the present invention, the descriptive data of entry 208 may be composed of a wide range of differing data types. For example, the descriptive data for root beer may be an enumerated class or a defined integer value. Alternatively, the descriptive data may simply be the ASCII string "root beer." Functionally, the data contained in the poly radix bit string serves to provide "meaning" to the data object 202 by indicating how the associated data object 202 is to be interpreted.

In addition to defining the data objects 202, each poly radix bit string entry 208 is hashable to return a pointer to the corresponding data object 202. Referring again to FIG. 2, it may be seen that hashing entry 208a yields a pointer 210a which points to data object 202a. Similarly, each entry 208 may be likewise hashed to return a pointer to the associated data object 202. For the present invention, a wide range of hashing functions may be used. In fact, any hashing function which can utilize the data contained in entries 208 to return pointers to unique memory locations for data objects 202 may be effectively employed by the present invention.

A global object table 212 forms the top level of the data structure 200. Like the instance tables 206, the global object table 212 is formed as an indexed array of entries 214, where each entry 214 is a poly radix bit string. Each poly radix bit string entry 214 contains data which describes an associated object class 204. Additionally, each poly radix bit string is hashable to return a pointer to the instance table 206 associated with the described object class 204. Continuing with FIG. 2, it may be seen that the first entry 214a in the global object table 212 contains data which describes the "beverage" object class 214a. Additionally, it may be seen that the first entry 214a is hashable to return a pointer 216a to the instance table 206a associated with the beverage object class 214a.

As was the case with instance table 206, the data contained in poly radix bit string entries 214 of global object table 212 may be composed of a wide range of varying data types. In fact, any data type which is appropriate for the description of the associated object class 204 may be effectively used by the present invention.

Figure 3:
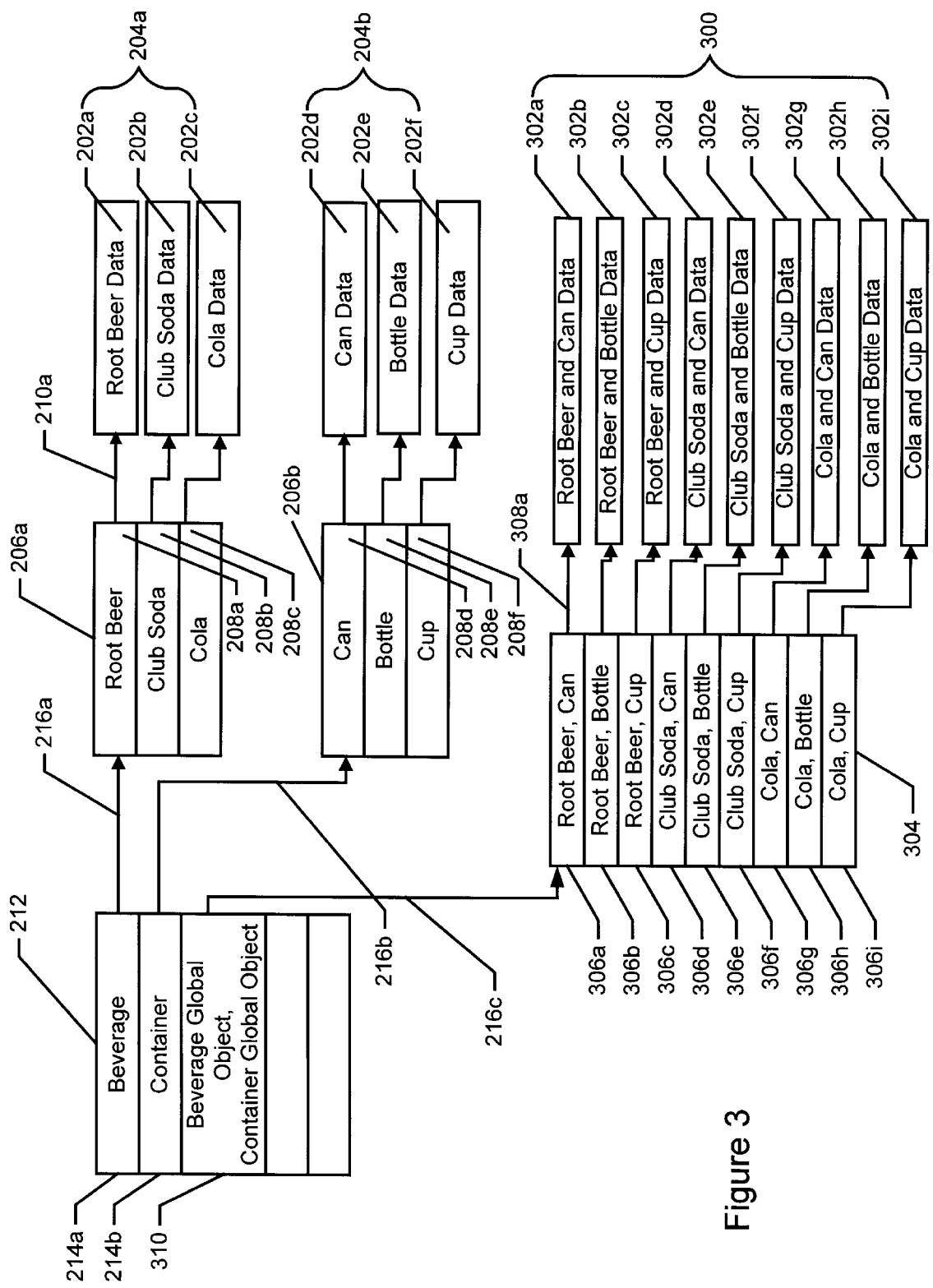
FIG. 3 is an example of the database of FIG. 2 showing the addition of a complex data class.

In some cases, it may be desirable to use the data structure 200 of the present invention in combination with complex data objects, or data objects which are described in terms of several entries 214 within the global object table 212. This type of use is shown in FIG. 3 where a complex data class is shown and designated 300. Each complex data object 302a through 302i includes data relating to both the "beverage" object class 204a and the "container" object class 204b. A complex instance table 304 is associated with the complex object class 300 and includes one entry, 306a through 306i, for each data object 302 in the complex object class 300.

Figure 4:
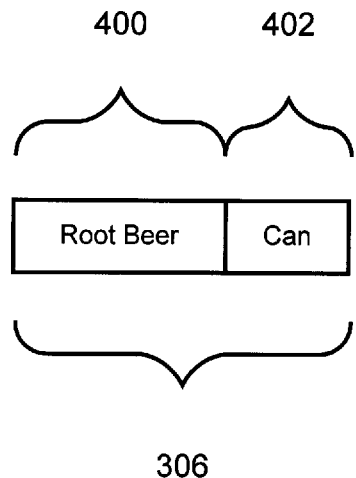
FIG. 4 is a block diagram of a poly radix bit string as used for an instance table entry of the present invention.

Each entry 306 in the complex instance table 304 is implemented as a poly radix bit string which is shown in greater detail in FIG. 4. In FIG. 4, the poly radix bit string from entry 306a is shown to include a first substring 400 which describes "root beer" and a second substring 402 which describes "can." First substring 400 may be used to access the entry 208a in instance table 206a that is associated with the root beer data object 202a. Similarly, second substring 402 may be used to access the entry 208d in instance table 206b that is associated with the can data object 202d. The overall effect of first string 400 and second string 402 is to describe a complex data object 302a in the complex class 300. The entire poly radix bit string entry 306a is hashable to return a pointer 308a which forms an association between complex data object 302a and entry 306a.

Figure 5:
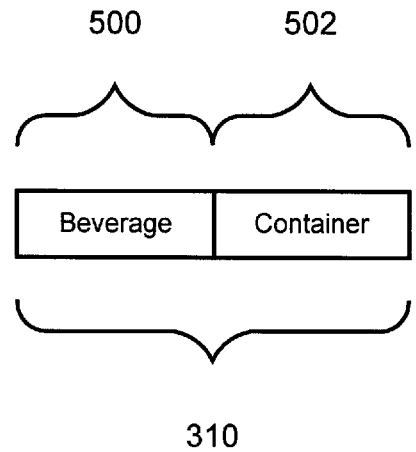
FIG. 5 is a block diagram of a poly radix bit string as used for a global object table entry of the present invention.

Global object table 212 contains a complex global entry 310 for each complex object class 300. Each complex global entry 310 is, like other entries in the global object table 212, a poly radix bit string. For complex entries 310, however, each poly radix bit string is itself composed of several smaller substrings. The complex global entry 310 for complex class 300 is shown in FIG. 5 to include a first substring 500 and a second substring 502. First substring 500 describes the first object class 204, namely the beverage object class 204a, which is associated with complex object class 300. First substring 500 may also be used to access entry 214a in the global object table 212 which is associated with the beverage object class 204a. Similarly, the second substring 502 describes the second object class 204 in complex object class 300 (i.e. the container object class 204b). Second substring 502 may also be used to access entry 214b in the global object table 212 which is associated with the container object class 204b. In this way, each substring 500, 502 simultaneously describes one element in the complex class 300 and may be used to access the underlying data objects 202 within that object class 204. The entire complex entry 310, consisting of first substring 500 and second substring 502, may be hashed to return a pointer to the complex instance table 304 which is associated with the complex object class 300.

Figure 6:
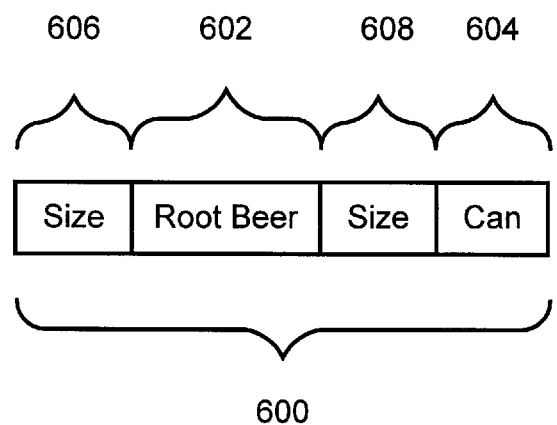
FIG. 6 is a block diagram of an alternate embodiment for the poly radix bit string as used for the present invention.

For some implementations, it may be possible to improve the space efficiency of data structure 200 by utilizing a modified poly radix bit string as shown in FIG. 6 and designated 600. Structurally, modified poly radix bit string 600 includes a first substring 602 and a second substring 604 which correspond to the first substring 400 and second substring 402 of FIG. 4. Modified poly radix bit string 600 includes a first size field 606 associated with first substring 602 and a second size field 608 associated with second substring 604. Functionally, first and second size fields, 606 and 608 allow the size of the following substring 602, 604 to be specified. For example, if the maximum size of a particular substring 602, 604 is known to be, for example, twenty-four bits, the actual size used by a particular instance of the substring 602, 604 may be encoded in a size field 606, 608 which is five bits in length. For cases where a substring 602, 604 has a relatively large maximum size but many instances of the substring 602, 604 are relatively small in length, the use of size fields, such as size fields 606 and 608, may allow the overall space used for all substrings to be decreased.

Figure 7:
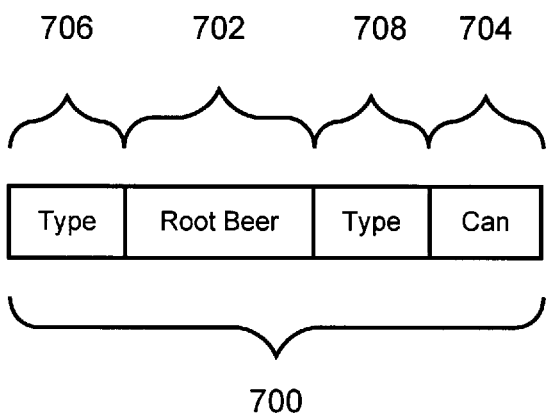
FIG. 7 is a block diagram of a second alternate embodiment for the poly radix bit string as used for the present invention.

Another modified poly radix bit string is shown in FIG. 7 and designated 700. Modified poly radix bit string 700 includes a first type field 706 associated with first substring 702 and a second type field 708 associated with second substring 704. Functionally, first and second type fields, 706 and 708 allow the type of the following substring 702, 704 to be specified. Within the data structure 200, the type fields 706, 708 shown in FIG. 7 may allow certain operations to be optimized. For example, a type field of this nature may be used in the complex table entry 310 of FIG. 5 to indicate that a reference is being made to the global object table 212 and not an instance table 206. Type fields of this nature may also be used to indicate that an actual data object 202, such as a Boolean value, is being stored directly in an instance table 206 and not in a remote location which can be reached by hashing the data in the instance table 206.

The present invention further incorporates an article of manufacture, which is a computer readable medium such as a floppy disk, optical disk, or hard drive, etc., storing a data structure 200 as described in the preceding paragraphs with reference to FIGS. 1 though 7.

In addition to the data structure 200 described above, the present invention is also a method of maintaining a database using the previously described data structure 200. The method of the present invention, or more specifically, the method of constructing the data structure 200 of FIG. 2, is show as a flow chart in FIG. 8 and designated 800. As may be seen in that figure, the method 800 begins with step 802 which represents grouping of the data objects 202 into various objects classes 204. In terms of FIG. 2, of course, this represents grouping of the data objects 202 into the object class for beverages 204a and the object class for containers 204b.

Step 802 is followed by step 804 which represents construction of a instance table 206 for each object class 204. In FIG. 2, two instance tables are constructed, instance table 206*a* for object class 204*a* and instance table 206*b* for object class 204*b*.

In the following step, step 804, an instance table entry 208 is constructed for each data object 202. Construction of the instance tables entries 208 requires construction of a poly radix bit string which describes each data object 202. The poly radix bit string become the instance table entry 208 which is associated with a particular data object 202. Each poly radix bit string entry 208 is then hashed to return a pointer to a memory region. The data object 202 which is associated with a particular instance table entry 208 is then copied to the memory location return by hashing the instance table entry 208.

Figure 8:
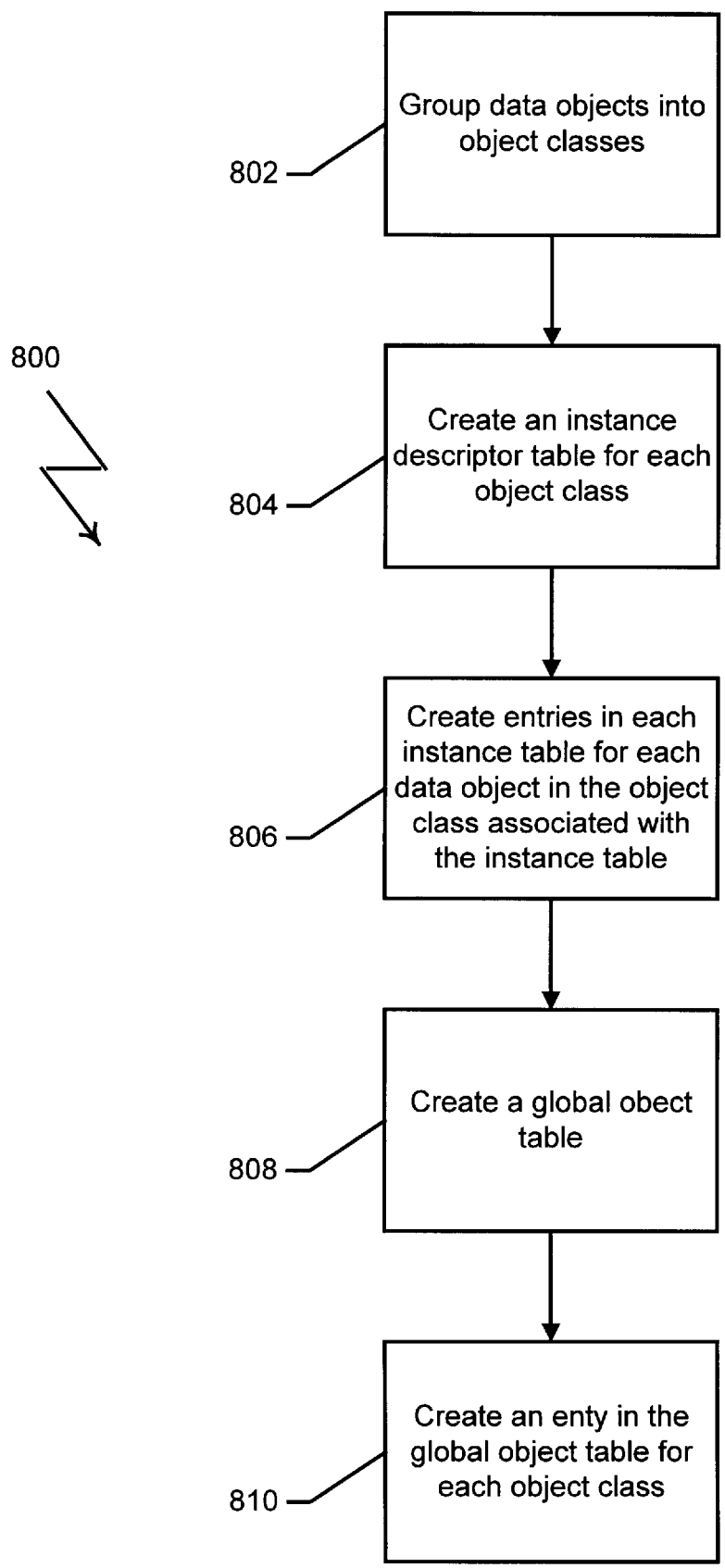
FIG. 8 is a flowchart showing the method of constructing the database of the present invention.

After completion of the instance tables 206, a global object table 212 is created. This step is shown in FIG. 8 and designated 808. Step 808, construction of the global object table 212 is followed by step 1010 where a table entry 214 is created for each object class 204. Creation of the table entry 214 requires creation of a poly radix bit string which contains information which describes a particular object class 204. This poly radix bit string becomes an entry 214 in the global object table 212. The poly radix bit string that forms the table entry 214 is then hashed to return a pointer to a memory location. The instance table 206 associated with the object class 204 described by the table entry 214 is then copied to this memory location.

The present invention is also a method of accessing a database using the previously described data structure 200. The method of accessing the data structure 200 of FIG. 2, is show as a flow chart in FIG. 9 and designated 900. As may be seen in that figure, the method 900 begins with step 902 which represents searching the global table for an entry which matches a target class. For example, assuming the data structure 200 of FIG. 2, the global object table 212 may be searched for the beverage object class 204*a*. In such a case, the first entry 212*a* matches the target class and is selected.

Step 902 is followed by step 904 which represents hashing the target class 212 to create a pointer 216*a* to the instance table 206*a* associated with the beverage object class 204*a*. This pointer is then utilized in step 906 to search the instance table for a match to the target subclass. If the target subclass is root beer, the first entry 208*a* matches and will be selected.

Once located, the entry 208*a* is hashed in the following step 908. Hashing of the entry 208 creates a pointer to the object data 202*a* which is associated with the entry 208*a*. Finally, step 910 represents dereferencing of the pointer 210 generated in the preceding step 908 to access the data object 202*a* which matches the target class and subclass.

Figure 9:
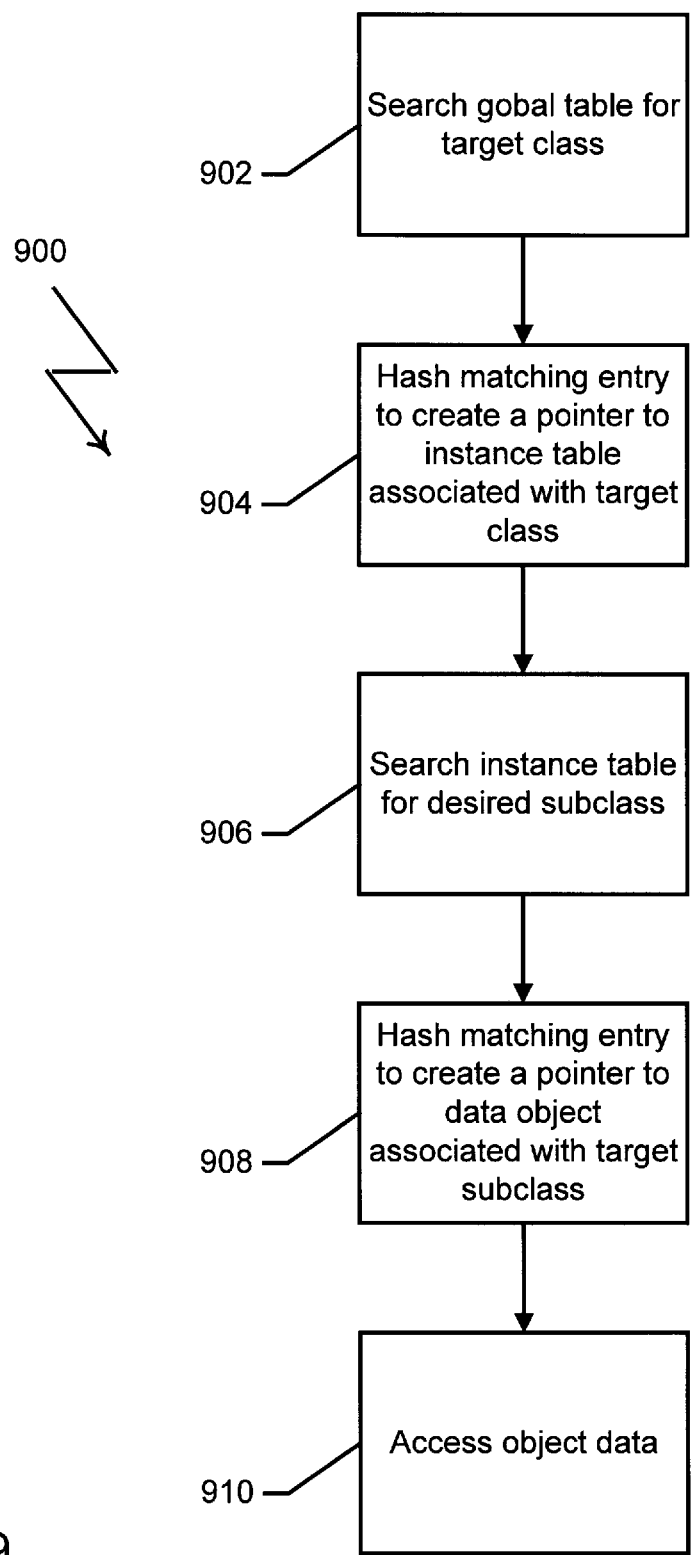
FIG. 9 is a flowchart showing the method of accessing the database of the present invention.

The present invention specifically includes an apparatus designed to perform the steps required by FIGS. 8 and 9. This apparatus is shown symbolically in FIG. 1 as database manipulation program 114. More specifically, the apparatus includes a first computer executable procedure for manipulating the global object table 212. The first procedure allows the global object table 212 to be created, and once created, to be traversed. The apparatus of the present invention also includes a second computer executable procedure for manipulating instance tables 206. The second computer executable procedure allows instance table 206 to be created, and once created, to be traversed.

The present invention further incorporates an article of manufacture, which is a computer readable medium such as a floppy disk, optical disk, or hard drive, etc., storing instructions of a type executable by a CPU to perform the steps of FIGS. 8 and 9.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A method for storing data objects in the memory of a data processing system, the method performed by the data processing system and comprising the following steps:

grouping the data objects to form object classes;

creating an instance descriptor table for each object class, each instance descriptor table having one entry for each data object in the associated object class, each entry being a poly radix bit string containing data which describes the corresponding data object, each poly radix bit string also being hashable to return a pointer to the corresponding data object; and creating a global object table having one entry for each object class, each entry being a poly radix bit string containing data which describes the corresponding object class, each poly radix bit string also being hashable to return a pointer to the instance descriptor table associated with the object class.

2. A method as recited in claim 1 further comprising the steps of:

creating combinations of object classes to form one or more complex object classes;

creating complex data objects for each complex object class, each complex data object including one data object from each object class in the corresponding complex object class;

creating an instance descriptor table for each complex object class, each instance descriptor table having one entry for each complex data object in the associated complex object class, each entry being a poly radix bit string having one substring corresponding to each object in the corresponding complex data object, each substring describing one data object in the corresponding complex data object, each substring also being usable to access the described data object, the poly radix bit string being hashable to return a pointer to the corresponding complex data object; and creating a complex entry in the global object table for each instance descriptor associated with a complex object class, each complex entry being a poly radix bit string having one substring corresponding to each object class in the corresponding complex object class, each substring describing one object class in the corresponding complex object class, each substring also being usable to access the entry in the global object table associated with the described object class, the poly radix bit string being hashable to return a pointer to the instance descriptor table associated with the complex object class.

3. A method as recited in claim 1 wherein the step of creating an instance descriptor table for each object class further comprises the step of generating a poly radix bit string for each data object.

4. A method as recited in claim 3 wherein the step of generating a poly radix bit string for each data object further comprises the steps of:

creating a bit string for each data object, the bit string containing data which describes the corresponding data object;

hashing each bit string to return a pointer to a unique memory location; and copying the data object to the memory location returned by hashing the bit string.

5. A method as recited in claim 1 wherein the step of creating a global object table further comprises the step of generating a poly radix bit string for each object class.

6. A method as recited in claim 5 wherein the step of generating a poly radix bit string for each object class further comprises the steps of:

creating a bit string for each object class, the bit string containing data which describes the corresponding object class;

hashing the bit string to return a pointer to a unique memory location; and copying the instance table associated the corresponding object class to the memory location returned by hashing the bit string.

7. A database for manipulating data objects, the database comprising:

an instance descriptor table for each class of data objects, each instance descriptor table having one entry for each data object in the associated object class, each entry being a poly radix bit string containing data which describes the corresponding data object, each poly radix bit string also being hashable to return a pointer to the corresponding data object; and a global object table having one entry for each object class, each entry being a poly radix bit string containing data which describes the corresponding object class, each poly radix bit string also being hashable to return a pointer to the instance descriptor table associated with the object class.

8. A database as recited in claim 7 further comprising:

an instance descriptor table for each class of complex data objects, each instance descriptor table having one entry for each complex data object in the associated complex object class, each entry being a poly radix bit string having one substring corresponding to each object in the corresponding complex data object, each substring describing one data object in the corresponding complex data object, each substring also being usable to access the described data object, the poly radix bit string being hashable to return a pointer to the corresponding complex data object; and a complex entry in the global object table for each instance descriptor associated with a complex object class, each complex entry being a poly radix bit string having one substring corresponding to each object class in the corresponding complex object class, each substring describing one object class in the corresponding complex object class, each substring also being usable to access the entry in the global object table associated with the described object class, the poly radix bit string being hashable to return a pointer to the instance descriptor table associated with the complex object class.

9. A database as recited in claim 7 wherein each poly radix bit string further comprises one or more substrings.

10. A database as recited in claim 9 wherein each substring contains an initial field containing data indicating the length of the substring.

11. A database as recited in claim 9 wherein each substring contains an initial field containing data indicating the type of the substring.

12. An apparatus for manipulating a database stored in the memory of a data processing system, the apparatus comprising:

a first computer executable procedure for manipulating a global object table having one entry for each object class of data objects, each entry being a poly radix bit string containing data which describes the corresponding object class, each poly radix bit string also being hashable to return a pointer to the instance descriptor table associated with the object class; and a second computer executable procedure for manipulating an instance descriptor table, the instance descriptor table having one entry for each data object in an associated object class, each entry being a poly radix bit string containing data which describes the corresponding data object, each poly radix bit string also being hashable to return a pointer to the corresponding data object.

13. An apparatus as recited in claim 12 which further comprises a third computer executable procedure for manipulating a complex entry in the global object table, each complex entry being a poly radix bit string having one substring corresponding to each object class in a corresponding complex object class, each substring describing one object class in the corresponding complex object class, each substring also being usable to access the entry in the global object table associated with the described object class, the poly radix bit string being hashable to return a pointer to an instance descriptor table associated with the complex object class.

14. An apparatus as recited in claim 13 which further comprises a fourth computer executable procedure for hashing a poly radix bit string to return one or more pointers, each pointer being the location of an instance table or a data object.

15. An article of manufacture comprising:

a computer readable device encoded with a first computer executable procedure for manipulating a global object table having one entry for each object class of data objects, each entry being a poly radix bit string containing data which describes the corresponding object class, each poly radix bit string also being hashable to return a pointer to the instance descriptor table associated with the object class; and a second computer executable procedure encoded on the computer readable device for manipulating an instance descriptor table, the instance descriptor table having one entry for each data object in an associated object class, each entry being a poly radix bit string containing data which describes the corresponding data object, each poly radix bit string also being hashable to return a pointer to the corresponding data object.

16. An article of manufacture as recited in claim 15 which further comprises a third computer executable procedure encoded on the computer readable device for manipulating a complex entry in the global object table, each complex entry being a poly radix bit string having one substring corresponding to each object class in a corresponding complex object class, each substring describing one object class in the corresponding complex object class, each substring also being usable to access the entry in the global object table associated with the described object class, the poly radix bit string being hashable to return a pointer to an instance descriptor table associated with the complex object class.

17. An article of manufacture as recited in claim 16 which further comprises a fourth computer executable procedure for hashing a poly radix bit string to return one or more pointers, each pointer being the location of an instance table or a data object.

* * * * *